(12) United States Patent
Rinne et al.

(10) Patent No.: US 7,707,474 B2
(45) Date of Patent: Apr. 27, 2010

(54) OUTER LOOP POWER CONTROL WITH TRANSPORT BLOCK DIVERSITY TRANSMISSION

(75) Inventors: Mika Rinne, Espoo (FI); Manuel Gregory, Helsinki (FI)

(73) Assignee: Nokia Corporation, Espoo (FI)

( * ) Notice: Subject to any disclaimer, the term of this patent is extended or adjusted under 35 U.S.C. 154(b) by 245 days.

(21) Appl. No.: 11/193,455

(22) Filed: Aug. 1, 2005

(65) Prior Publication Data

US 2006/0026490 A1    Feb. 2, 2006

(30) Foreign Application Priority Data

Aug. 2, 2004    (EP)    ................... 04018283

(51) Int. Cl.
G08C 25/02    (2006.01)
(52) U.S. Cl. .................. 714/748; 714/704; 714/705; 714/708; 714/774; 343/814
(58) Field of Classification Search ............ 714/748, 714/704, 705, 708, 774; 343/814
See application file for complete search history.

(56) References Cited

U.S. PATENT DOCUMENTS

| | | | | |
|---|---|---|---|---|
| 6,101,168 | A * | 8/2000 | Chen et al. ............. | 370/228 |
| 6,240,460 | B1 * | 5/2001 | Mitsutake et al. ......... | 709/235 |
| 6,463,290 | B1 * | 10/2002 | Stilp et al. ............. | 455/456.1 |
| 6,587,985 | B1 * | 7/2003 | Fukushima et al. ....... | 714/748 |
| 6,704,898 | B1 * | 3/2004 | Furuskar et al. ......... | 714/751 |
| 6,711,150 | B1 |  3/2004 | Vanghi | |
| 6,757,537 | B1 * | 6/2004 | Choi et al. ............. | 455/438 |
| 6,867,708 | B2 * | 3/2005 | Darby et al. ............ | 340/933 |
| 6,880,103 | B2 * | 4/2005 | Kim et al. .............. | 714/18 |
| 2002/0173312 | A1 * | 11/2002 | Takano et al. ........... | 455/452 |
| 2004/0137930 | A1 |  7/2004 | Kim et al. | |

OTHER PUBLICATIONS

Young-Gook Kim, TCP-friendly Internet video with smoooth and fast rate adaptation and network-aware error control, 2004, IEEE, vol. 14, pp. 256-258.*
3GPP-TS 25.309 V0.2.0, "$3^{rd}$ Generation Partnership Project; Technical Specification Group Radio Access Network; FDD Enhanced Uplink; Overall description" Jun. 2004, pp. 1-10.
3GPP-TR 25.896 V6.0.0, "$3^{rd}$ Generation Partnership Project; Technical Specification Group Radio Access Network; Feasibility Study for Enhanced Uplink for UTRA FDD (Release 6)" Mar. 2004, pp. 1-179.

* cited by examiner

Primary Examiner—M. Mujtaba K Chaudry
Assistant Examiner—Enam Ahmed
(74) Attorney, Agent, or Firm—Squire, Sanders & Dempsey L.L.P.

(57) ABSTRACT

The invention proposes a method for controlling a variable of transmission between a mobile network element and a fixed network element, wherein the transmission is effected by repeatedly sending of data units, and a control of the variable of the transmission based on a target data unit error rate is performed, the method comprising the steps of detecting (S2), whether a received data unit includes an error, analyzing (S3), in case an error is detected, the transmission number of the data unit, detecting (S4), whether the analyzed diversity of the data unit is equal to a target transmission number, and forwarding (S5) the data unit to a network control element in case the transmission number of the data unit is equal to the target transmission number, or in case no error is detected. The invention also proposes a corresponding fixed network element and a corresponding network control element.

24 Claims, 5 Drawing Sheets

OUTER LOOP POWER CONTROL WITH TRANSPORT BLOCK DIVERSITY TRANSMISSION

BACKGROUND OF THE INVENTION

1. Field of the Invention

This application claims priority under 35 U.S.C. 119 from European Patent Application No. 04 018 283.4, filed on Aug. 2, 2004.

The invention relates to a method for controlling a variable of a transmission, to a fixed network element and a network control element, wherein data units (e.g., Transport Blocks) are sent using a time diversity.

2. Description of the Related Art

The invention relates to power control in a radio access network such as UTRAN (UMTS Radio Access Network), for example. There are basically two main forms of power control in UTRAN, namely open loop power control (which is usually used in an initial stage) and closed loop power control (which is used during an ongoing communication). The closed loop power control is divided into the so-called inner loop power control and the so-called outer loop power control. The inner loop power control is performed between the base station (Node B) and the User Equipment (UE) based on the Signal to Interference Ratio (SIR), such that the current SIR reaches a target SIR. The target SIR is determined in the outer loop power control by a Radio Network Controller (RNC). The target SIR is determined based on the Block Error Rate (BLER). That is, the Outer-Loop Power Control (OLPC) checks the BLER ratio of the Transport Blocks (TB) compared to a target BLER during an OLPC update period and performs a so-called target-UP step, if the observed BLER is higher than the observed target, and otherwise a so-called target-DOWN step. Based on this, the RNC forwards a new target SIR to the Node B and the UE. The target BLER used by the RNC is also determined based on the required quality of service for a particular service etc.

Recently, new measures to increase the data rate in UMTS in downlink and uplink direction have been proposed, namely High Speed Downlink Packet Access (HSDPA) and High Speed Uplink Packet Access (HSUPA). The invention is in particular directed to HSUPA, but not limited thereon. In HSUPA is an enhanced uplink transport in WCDMA (Wideband Code Division Multiple Access) in which a so-called Enhanced Dedicated Channel (E-DCH) is used, which includes time-diversity transmission techniques. These time diversity transmission techniques may include ARQ (Automatic Repeat request), HARQ (Hybrid ARQ), HARQ+Chase Combining, HARQ+IR (Incremental Redundancy) These ARQ schemes perform a repetition of sending of a Transport Block (TB) in case the TB was corrupted or the like.

Due to the retransmissions performed on the E-DCH, when the OLPC algorithm described above is applied without any modification, a problem may occur that the BLER target will not be met accurately. That is, for example, unnecessary high transmission power will be wasted. In addition, this problem may also occur to other variables in the control in HSUPA and the like which depend on the BLER target.

SUMMARY OF THE INVENTION

Hence, it is an object of the present invention to overcome this problem.

This object is solved by a method for controlling a variable of transmission between a mobile network element and a fixed network element, wherein the transmission is effected by repeatedly sending of data units, and a control of the variable of the transmission based on a target data unit error rate is performed, the method comprising the steps of detecting whether a received data unit includes an error, analysing, in case an error is detected, the transmission number of the data unit, detecting whether the analyzed diversity of the data unit is equal to a target transmission number, and forwarding the data unit to a network control element in case the transmission number of the data unit is equal to the target transmission number, or in case no error is detected.

Alternatively, this object is solved by a fixed network element for performing transmission between a mobile network element and the fixed network element, wherein the transmission is performed by controlling a variable of transmission, wherein the transmission is effected by multiple sending of data units, and a control of the variable of the transmission based on a target data unit error rate is performed, the fixed network element comprising means for detecting, whether a received data unit includes an error, means for analysing the transmission number of a data unit, when the data unit includes an error, means for detecting, whether the transmission number of the data unit including an error is equal to below a target number, and means for forwarding the data unit to a network in case the transmission number of the data unit is equal to the target number or in case no error is detected by the error detecting means.

The invention also proposes a network control element for controlling a variable of transmission between a mobile network element and a fixed network element, wherein the transmission is effected by multiple sending of data units, and a control of the variable of the transmission based on a target data unit error rate is performed, the network control element comprising means for collecting statistics regarding a positive or a negative result of an error check of data units transmissions, and means for determining the target data unit error rate based on a ratio between receptions of data units with error and receptions of data units without error.

Thus, according to the invention, a transmission number, i.e., the diversity of data units (e.g., Transport Blocks TB) to be sent is considered upon controlling a transmission variable (e.g., transmission power). In this way, the accuracy of the control can be improved.

That is, for example in case the transmission power is controlled, unnecessary waste of power can be provided, since due to the more accurate control, less power is required for the transmission between the mobile network element (e.g., a User Equipment (UE)) and the fixed network element (e.g., a base station (Node B)).

The invention also proposes a mobile network element, which is configured to perform transmission and a fixed network element by repeatedly sending data units, comprising means to receive an instruction signal to change a variable of transmission, wherein the variable of transmission is controlled based on a target data unit error rate.

Further advantageous developments are set out in the dependent claims.

BRIEF DESCRIPTION OF THE DRAWINGS

The invention is described by referring to the enclosed drawings, in which.

DETAILED DESCRIPTION OF THE PREFERRED EMBODIMENT

Figure 1A:
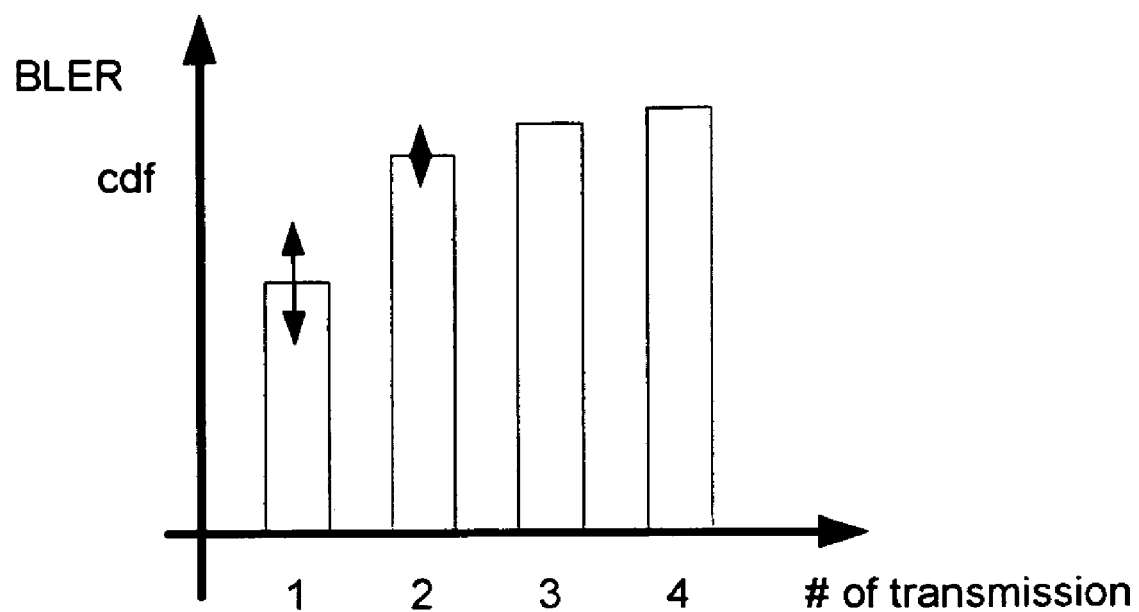
FIG. 1a shows the cdf (Cumulative Distribution Function) of the BLER as a function of the number of L1 HARQ transmissions.

In the following, preferred embodiment of the present invention is described by referring to the attached drawings.

However, at first the general idea of the invention is described in more detail. According to the invention, the time diversity is considered when controlling a variable of transmission between a mobile network element (e.g., UE (User Equipment)) and a fixed network element (e.g., a base station (Node B)) based on a data unit error rate. The data unit error rate may be Block Error Rate (BLER) of Transport Blocks (TB), for example. In particular, it checked whether a received data unit includes an error. In case there is an error, the diversity order of a transmission of data units (e.g., Transport Blocks (TB)) is analysed, and it is checked whether this diversity order is equal to a diversity target order. If this is the case, the corresponding data unit is forwarded to the network (i.e., to the next network control element, e.g., RNC (Radio Network Controller). In case no error of the data unit was detected, the data unit is forwarded without considering the diversity.

The term "diversity order" as an example for a transmission number refers to the number of reception attempts of the same data unit (e.g., the same Transport Block) at the receiver side. That is, the diversity order is basically a value (a counter) associated with a particular Transport Block. In detail, the value of the diversity order is incremented each time a further transmission of a particular transport block is received.

The term "target diversity" as an example for a target transmission number refers to a value which can freely be set for the diversity order. Preferably, it should be set to a diversity optimum, as will be described later.

In the following, this modification is explained in more detail by referring to an embodiment in which the transmission power is used as an example for the controlled variable. That is, the procedure according to the invention is described for the example of the Outer-Loop Power Control (OLPC).

That is, according to the present embodiment, the OLPC is modified such that it works with a physical layer retransmission and combining scheme (e.g., HARQ and its variants). In particular, a target value of the time diversity order of the E-DCH is introduced to the OLPC algorithm in order to prevent unnecessary and incorrect OLPC actions.

As mentioned above, the Outer-Loop Power Control (OLPC) checks the BLER ratio of the Transport Blocks (TB) compared to the target BLER during the OLPC update period and makes the target-UP step, if the observed BLER is higher than the BLER target, and otherwise target-DOWN step.

For any L1 (Layer 1) retransmission scheme as ARQ, HARQ, HARQ+Chase Combining, HARQ+IR it is favourable that the probability of correct decoding of the first Transport Block is not too high. If this probability is (too) high, it means that too much transmission power is consumed for this transmission vs. the channel and load conditions at the receiver. As the instantaneous channel conditions and load situation are not exactly known, the transmission power will not be exactly known and besides there is some inherent inaccuracy of the transmission power at the transmitter. The probability of retransmissions and their inaccuracy is shown in FIG. 1.

Figure 1B:
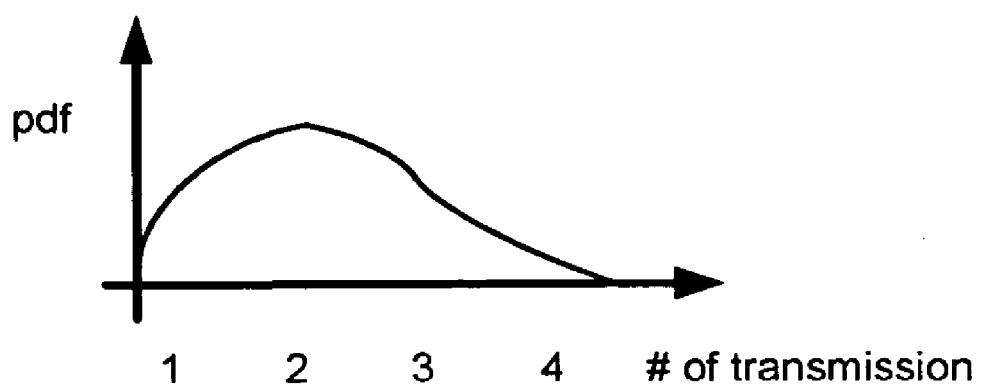
FIG. 1b shows the pdf (Probability Density Function) of correct reception per Transport Block.

FIG. 1a shows the cdf (Cumulative Distribution Function) of BLER (Block Error Rate) as a function of the number of L1 HARQ transmissions, and FIG. 1b shows the pdf (Probability Density Function) of correct reception per Transport Block. In this example, the diversity optimum is adjusted to the second transmission. This allows the first transmission to operate at cautious power avoiding excessive transmit power first and then relying on diversity and soft combining to correctly decode the second transmission. Third and fourth transmissions are necessary too as there always exists the (non-narrow) distribution, because of the time variation of the channel.

Figure 2:
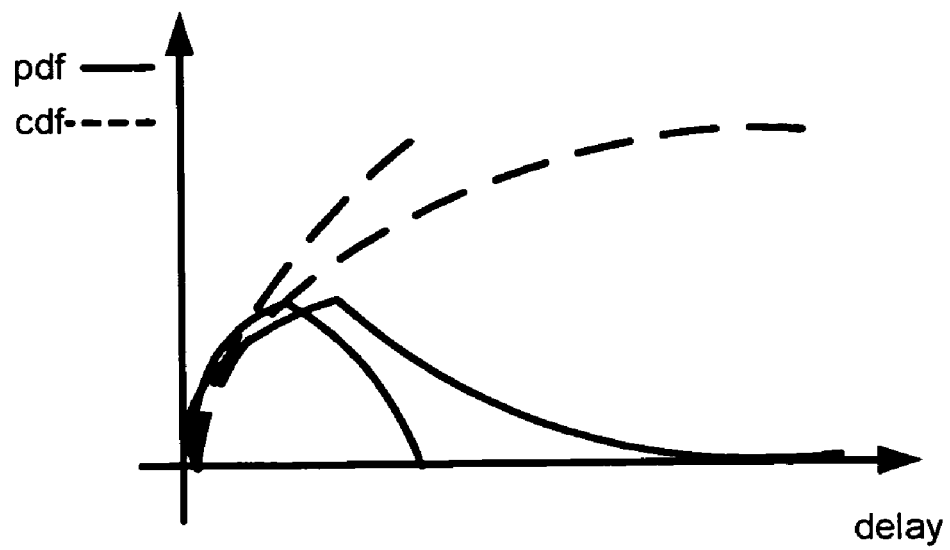
FIG. 2 shows an illustration of the pdf (Probability Density Function) and cdf (Cumulative Distribution Function) of the packet delay with and without L1 HARQ for the E-DCH.

The pdf (Probability Density Function) and cdf (Cumulative Distribution Function) of the packet delay distribution without and with L1 HARQ for the E-DCH are shown in FIG. 2.

In any fading and shadowing environment, the diversity is seen vital. The rake receiver adds the multipath diversity, but the time diversity is very powerful as well. Thus, according to the invention, the L1 HARQ techniques will be specified for the E-DCH transport.

Figure 3:
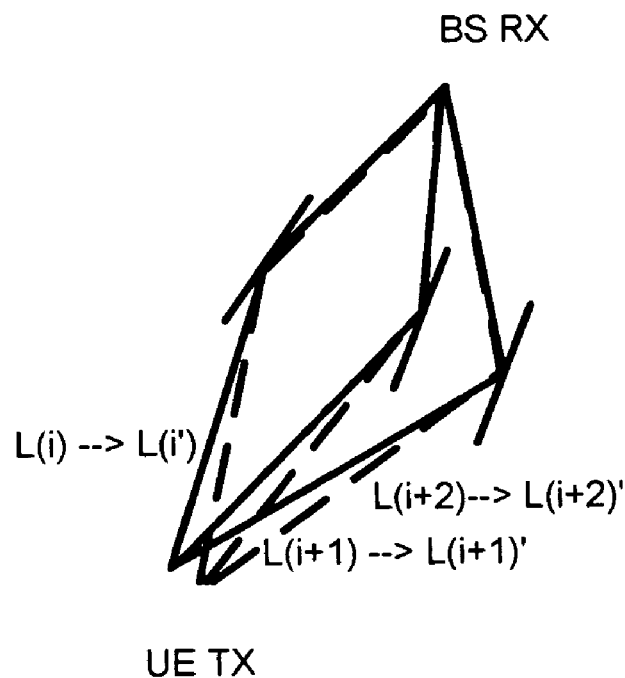
FIG. 3 shows an illustration of the multipath profile and the diversity order of first transmission and a retransmission.

The diversity order accumulation is visible in FIG. 3, which illustrates a multipath profile and a diversity order, when the channel changes (and/or the UE, i.e., the terminal moves) between the original transmission and the second transmission (first retransmission). The first transmission multipaths are indicated by bold lines and are denoted by L(i), L(I+1), . . . , whereas the second transmission multipaths are indicated by dashed lines and are denoted by L(i)', L(I+1)', . . . .

In the E-DCH, the L1 transmissions are typically wanted to appear with the first transmission having BLER of given value with a fairly high tolerance, relying on that the second transmission adds enough diversity, and after soft-combining will lead to a very high probability of correct decoding. Allowing more transmissions (3-4) is typically necessary to cut the residual tails of the probability of incorrect decoding, which would lead to some higher layer retransmission and increased delay. Allowing more than say 4 transmissions is typically not favoured, as advanced combining schemes can make the probability of residual incorrect decoding already very small and would just add as increased delay (finally approaching delay comparable to a higher layer retransmission).

Figure 4:
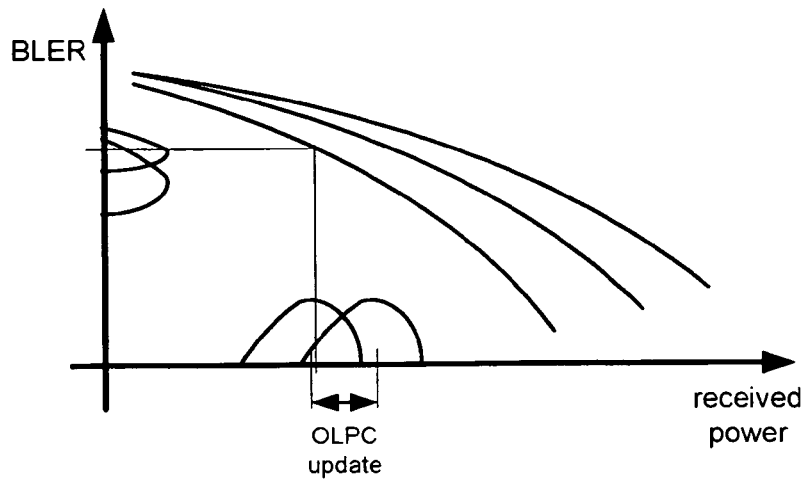
FIG. 4 shows an illustration of the received power distribution with the fast power control and the resulting received BLER distribution.

As it is the favoured situation that the first transmission has a given probability of error (+inaccuracy), it is certainly not wanted that this share will cause an update to the OLPC. The OLPC should instead give an update, only if the wanted BLER finally or optimally after applying time diversity will not meet the target, see FIG. 4. FIG. 4 shows the received power distribution with the fast power control and the resulting received BLER distribution. The OLPC update is visible, as the fast power control will gradually change the received power distribution and the BLER distribution to the new target values.

This is particularly true as the target-UP update is much larger than the target-DOWN update, thus any unnecessary target-UP update would cause waste of system resources during that transmission and a similar waning effect for a longer time period, which it would take to step target-DOWN back to the correct power level. It is proposed here, that the diversity optimum for L1 transmissions is close to two*(multipath diversity) and any higher number of retransmissions is necessary just for the sake of mitigating the tail of the probability of incorrect decoding. However, two transmissions can be expected to be close to the optimum of diversity*delay product. The selected diversity*delay product optimum should thus be the source of the OLPC update, omitting the diversity retransmissions.

With the conventional OLPC, the intentionally low BLER of the first transmission would occasionally lead to too high transmission power or occasionally to an unnecessary OLPC target-UP update. The consequence of the latter is too high transmission power for the next retransmissions. The impact of this would even last over several OLPC update periods as the target-DOWN stepsize is much smaller compared to the target-UP update. Even worse, this may happen for all L1 retransmissions, which were originally intended just to add diversity with close to constant transmission power. For L1 ARQ techniques, it is vital to allow the original transmission+ one retransmission with fairly high probability to get high increase in the diversity order. The allowed multiple L1 transmissions of a L1 Transport Block thus do not favourably have any impact to the OLPC and the fast power control should work towards the constant target, as the goal is to increase the diversity order. For the OLPC, the target update should act per OLPC period only for the observed BLERs after the second transmission (i.e. the first retransmission), as any deviation of meeting the target BLER after the second transmission is a deviation from the diversity optimum, and would imply a true need for the OLPC target update respectively. The traces of the OLPC without and with the invention are illustrated in FIG. 5.

Figure 5:
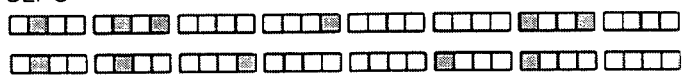
FIG. 5 shows an illustration of the OLPC trace without and with the procedure according to the embodiment of the invention.
Figure 5:
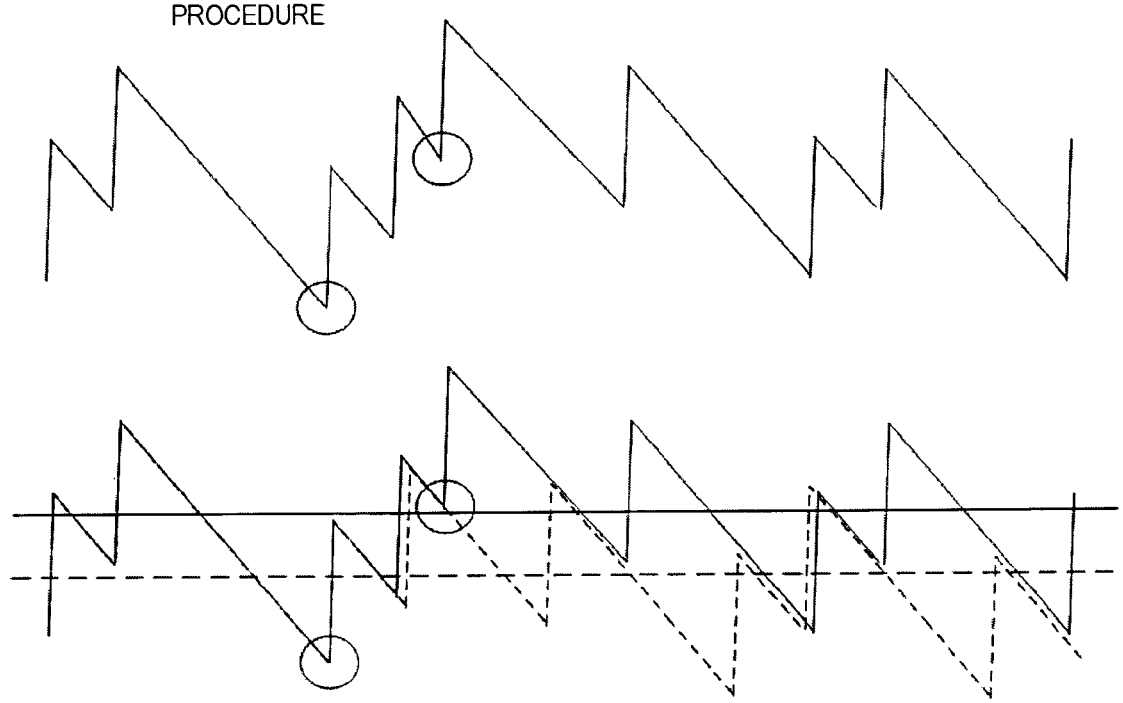

FIG. 5 shows the benefit of monitoring the BLER after the second transmission attempt. The OLPC with the procedure according to the present embodiment avoids some OLPC SIR target up due to first or higher than second transmission attempt errors (i.e. with diversity target set to two). The modified OLPC could also behave the same way as the prior art OLPC for some period of time depending on the channel behaviour. The procedure according to the present embodiment will on average allow to operate at lower transmission power, meeting the BLER target fixed after the second transmission attempts and this way gaining from time diversity and soft-combining.

In the upper part of FIG. 5, OLPC target command with and without the procedure according to the present embodiment are shown. The dashed block indicates an UP command while the blank block indicates a DOWN command. The lower part of FIG. 5 represents the OLPC trace. The horizontal lines show the long-term average of the OLPC trace. The solid line is the prior art OLPC, which is higher than the OLPC with the procedure according to the present embodiment, which is illustrated by a dashed line. The first circle represents an OLPC target-UP command that appears for both cases, because of too high BLER. The second circle is an update that is due to first or higher than second transmission attempt errors (i.e. with diversity target set to two) and is therefore avoided by the modified OLPC.

Sometimes the OLPC is equal with the prior art and invented methods, but clearly some OLPC target-UP updates are missing or appear later with the procedure according to the present embodiment. This improves the power behaviour and keeps the power target more close to the optimum.

To be precise, it is likely that a single Transport Block BLER does not have a direct impact to the OLPC update, but rather it is the BLER taken into account over all TBs during the OLPC period. However, if the contribution of all retransmitted blocks is added to the BLER calculation, the action deviates from the invented addition of only the second transmission BLER to the total BLER. The impact of each Transport Block BLER to the total BLER gets larger as the Transport Block size gets larger portion of the total TFCS size and when the OLPC period gets shorter.

When the E-DCH is code multiplexed to its own physical code channel separate from the DCH one, the conventional OLPC algorithm can run on the DCH code channel and the invented OLPC algorithm on the E-DCH code channel. When the DCH and E-DCH are multiplexed on to the same physical code channel, the OLPC should count to the BLER measure the DCH TBs normally, but the E-DCH TBs applying L1 ARQ (HARQ, HARQ+Chase combining, HARQ+IR and their variants), should only include the count of the second transmissions for the measure of incorrectly decoded blocks statistic. For the measure of correctly decoded Transport Block BLER statistics, all the correctly decoded blocks independent of their transmission attempts (i.e., irrespective of their diversity order) are counted as before.

It is noted that the optimum diversity order does not have to be exactly two*(multipath diversity), but it is likely somewhere between one to two times the multipath diversity. The procedure according to the embodiment applies directly, even if the optimum would be chosen between two to three transmissions. However, this is not always advantageous, because the delay would increase respectively.

Figure 6:
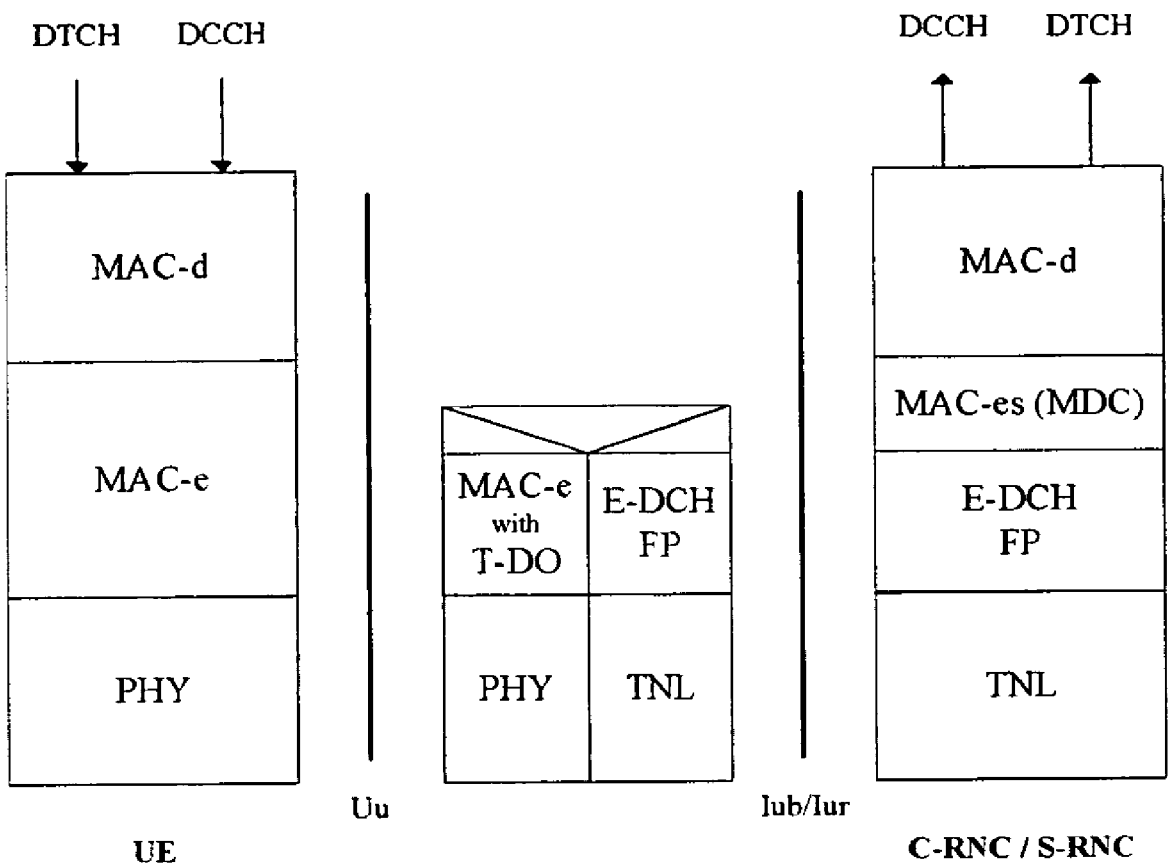
FIG. 6 shows a protocol model for the E-DCH transport channel with the solution according to the present embodiment included as the T-DO (Time Diversity Order analysis) function.

A possible Radio Interface Protocol Architecture for the E-DCH assuming coincident Controlling and Serving RNC is shown in FIG. 6. FIG. 6 shows a protocol model for the E-DCH transport model, wherein for the UE, a physical layer PHY, and MAC (Medium Access Control) layers are shown, in detail MAC-d handling a DCH channel and the like, and MAC-e handling HARQ retransmissions and the like. In FIG. 6, the solution according to the present embodiment is included as the T-DO (Time Diversity Order analysis) function.

In case inter-Node B soft handover is supported for the E-DCH, the macro diversity selection combining and reordering operation may take place in the MAC-e of the serving RNC (i.e. MAC-es in the figure). It is assumed here that the reordering will always happen in the RNC. The procedure according to the present embodiment places the OLPC to the SRNC (Serving RNC) as earlier and adds new functionality mainly to the Node B MAC-e (Medium Access Control e). This new functionality is called the time-diversity-order analysis function. The OLPC algorithm and its functional split between the Node B and the RNC is shown in FIG. 7.

Figure 7A:
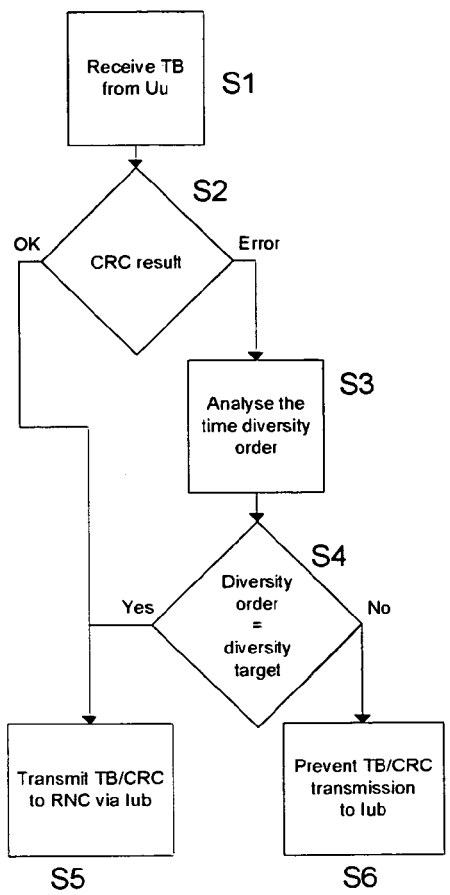
FIGS. 7a and 7b show flow charts of the OLPC algorithm according to the present embodiment.
Figure 7B:
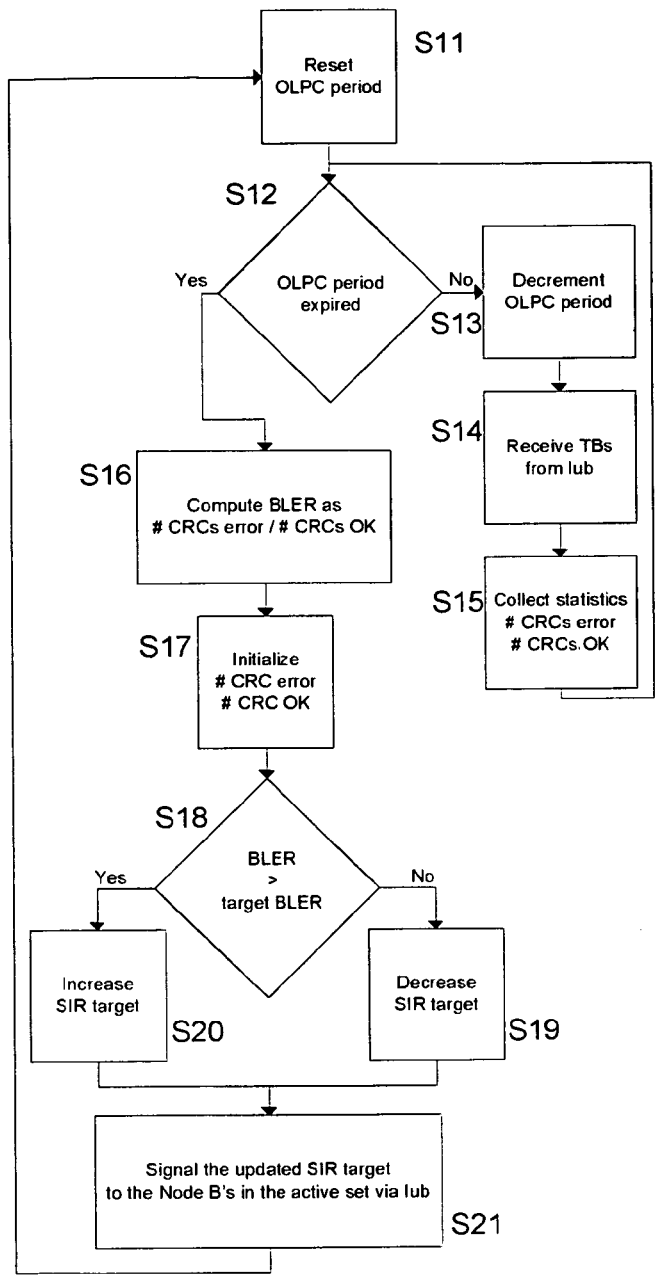

In detail, FIG. 7 is split in two parts, namely FIG. 7a showing the Node B algorithm, and FIG. 7b showing the RNC algorithm.

First, the Node B algorithm is described. In step S1, a Transport Block (TB) is received from the UE via the Uu interface. In step S2, the CRC (Cyclic Redundancy Checksum) is checked, and in case no error is detected (OK), the process proceeds with step S5, in which the TB and CRC result are sent to the RNC via the Iub interface. In case there is an error in the CRC result, the process proceeds to step S3, in which the time diversity order is analysed.

In step S4, the diversity order detected in step S4 is compared to the diversity target. In case the detected diversity is equal to the diversity target, the process proceeds with step S5, and the TB and CRC result are sent to the RNC. If, however, the diversity order is different from the diversity target, the TB and CRC result transmission is prevented, as shown in step S6.

As an example, the diversity target may be 1. Thus, the first TB will be forwarded to the RNC even in case the CRC result is negative, since in step S4 it is checked whether the detected diversity order is equal than the diversity target. In this example, the first TB will have the diversity order of 1, and, thus, will be forwarded to the RNC irrespective of the CRC result.

Thus, according to the present embodiment, incorrectly received TBs are just forwarded when diversity order= diversity target such that at RNC the BLER calculation equation is not changed but its output is now given the BLER after the diversity target. So if for example it is decided that diversity target is 2 (this is a parameter), then TBs incorrectly received for the second time will be forwarded only. Incorrect TBs received for the first, third, fourth . . . times will be left out.

In this way, other transmission attempts than that in which the diversity order (transmission number) is equal to the diversity target are not forwarded and are therefore not included in the statistics collection for BLER calculation to be explained later.

Hence, all correctly received Transport Blocks are forwarded independently of their diversity order, and just the incorrectly decoded blocks with a diversity order equal to the diversity target are also forwarded.

Next, the RNC algorithm shown in FIG. 7b is described. This procedure is always carried out during an OLPC period.

In step S11, the OLPC period is reset. Thereafter, it is checked in step S12 whether the OLPC period has expired or not. If this is not the case, the procedure proceeds to step S13, in which the OLPC period is decremented. In step S14, the TBs are received from the Iub interface (which are sent from the Node B in step S5), and in step S15 statistics are collected regarding the number of CRC errors (#CRCs error) and positive CRC checks (#CRCs OK). It is noted that in the number #CRCs error the number of the incorrectly decoded blocks with a diversity order equal to the diversity target is collected. Then, the process returns to step S12.

In case the OLPC period has expired, the process proceeds to step S16, in which the actual BLER is calculated as #CRC error/#CRCs OK. That is, the actual, i.e., observed BLER per OLPC period is calculated as: (number of incorrectly decoded blocks with diversity order equal to the target)/ (Number of correctly received blocks).

After this, #CRC error and #CRCs OK are initialized in step S17. That is, the statistics regarding #CRC error are #CRCs OK are collected in step S15 for one OLPC period, respectively. In step S18, the current BLER is compared to the target BLER. In case the current BLER is equal or smaller than the target BLER (NO), the SIR target is decreased in step S19. In case the current BLER is greater than the target BLER (YES), the SIR target is increased in step S20. After this, the updated SIR target is signalled to the Node B in the active set via the Iub interface.

Signalling Requirements

The outband signaling is always needed for the HARQ schemes with Chase combining or Incremental Redundancy. The outband information is defined and contains the HARQ process number and the New Data Indicator (NDI), which are also sufficient for the invented method to track the number of reception attempts for each E-DCH Transport Block.

For the HARQ without soft combining there is no outband signaling required by default. Thus, the transmission number needed for the invention could be defined into the Transport Block header. This would reserve two bits for four transmissions and three bits for eight transmissions respectively. This would allow two independent shots of multipath diversity transmissions to yield a correctly decoded Transport Block. Only if neither of them was correctly decoded, the OLPC is updated as the target-UP and the residual retransmissions would have decreased BLER operation point. This small overhead (two/three bits) in the header could be justified by the improved OLPC algorithm.

Another method associated to this solution is to allow the OLPC function with the error rate of the RLC PDUs (Radio Link Control Packet Data Units) (as in the R'99) instead of the error rate of MAC-e PDUs. This makes no difference for the R'99 DCH but it does make a difference for the E-DCH. The first assumption here is that one MAC-e PDU carries one or multiple RLC PDUs associated with one single CRC. The second assumption is that in one OLPC period we could have CRC statistics for multiple PDUs (Rel99 DCH or E-DCH or both). The solution is to weight the MAC-e PDU CRC by the number of RLC PDUs it contained and compute the BLER taken this weighting into account. The number of RLC PDUs that one MAC-e PDU carries would be available at the MAC-e entity of the Node B (by the E-TFCI (Enhanced Transport Format Combination Indicator)). The information about the number of PDUs per Block can be included to the Frame Protocol.

In the following, the benefits of the present embodiment are described.

The long term average power target in equal channel conditions is slightly lower with the invention than without it. This will allow transmit power reduction in the terminal and will save battery power as well. In the network, it will reduce the received wideband interference at the base station receiver and will generate a slightly lower noise rise.

The method does not exclude any type of multiplexing, as the E-DCH TBs will add to the BLER calculation of the sum of the other Transport Channel TBs with a suitable waiting and diversity order optimisation. If the E-DCH is alone on a physical code channel, it alone has the impact to the OLPC of that code channel. If the E-DCH is multiplexed with the DCHs to the same physical code channel, they have a mutual weighted impact to the OLPC.

Thus, according to the invention, a more accurate and reduced OLPC BLER target is yielded, when the E-DCH is present in the transmission. The reduced OLPC target will decrease the noise rise at the Node B receiver and will allow the terminals in the cell operate at lower transmission powers.

The method does not restrict the OLPC update period to any given fixed value. The OLPC update period can be one frame, one TTI (Transmission Time Interval), the longest TTI of the multiplex or any longer period as well.

In the following, the increase of diversity as a function of increased number of L1 transmissions is illustrated.

The multipaths of the first transmission for the duration of the TTI at $t_0$:

$L(i, t_0), L(i+1, t_0), L(i+2, t_0), \ldots$

The multipaths of the second transmission for the duration of the TTI at $t_0 + \Delta t$:

$L(i', t_0 + \Delta t), L((i+1)', t_0 + \Delta t), L((i+2)', t_0 + \Delta t), \ldots$ Where $L_i$ is the $i^{th}$ multipath component at the TTI time instant $t_0$ between the UE and a BS receiver. The changing radio dynamics will cause this path be transformed to the path Li' for the duration of the next TTI $t_0+\Delta t$. Additionally, some previous multipaths can become insignificant or some new multipaths can arise, when proceeding from TTI to TTI.

Thus, the diversity order of a single transmission compared to the diversity order of the first transmission with a given probability ($p_0$) and the second transmission probability ($p_1$) are significantly different. Respectively this can be updated to a larger number of retransmissions with a truncate to fixed limit N.

Diversity order ($L(i,t_0)$, $L(i+1,t_0)$, $L(i+2,t_0)$, ...)<Diversity order of $p_0$ ($L(i,t_0)$, $L(i+1,t_0)$, $L(i+2,t_0)$, ...)+$p_1$ ($L(i',t_0+\Delta t)$, $L((i+1)',t_0+\Delta t)$, $L((i+2),t_0+\Delta t)$, ...)

Generally the diversity order will increase for N allowed L1 transmissions as:

$$p_0(L(i, t_0), L(i+1, t_0), L(i+2, t_0), \ldots ) +$$
$$p_1(L(i', t_0+\Delta t), L((i+1), t_0+\Delta t), L((i+2)', t_0+\Delta t), \ldots ) +$$
$$p_2(L(i'', t_0+2\Delta t), L((i+1)'', t_0+2\Delta t), L((i+2)'', t_0+2\Delta t), \ldots ) +$$
$$p_k(L(i'^k, t_0+k\Delta t), L((i+1)^{\prime k}, t_0+k\Delta t), L((i+2)^{\prime k}, t_0+k\Delta t), \ldots ) +$$
$$\left(1 - \sum_{k=0}^{N-1} pk\right)(L(i'^{(N-1)}, t_0+(N-1)\Delta t),$$
$$L((i+1)^{\prime(N-1)}, t_0(N-1)\Delta t), L((i+2)^{\prime(N-1)}, t_0+(N-1)\Delta t), \ldots ))$$

The invention is not limited to the embodiment described above, and various modifications are possible.

For example, as already mentioned above, the transmission power is only an example for the variable to be controlled. Other variables may include the embodiments may be freely combined. For example, with respect to OLPC, all possible E-DCH OLPC control options that are based on an intermediate BLER could be controlled, such as rate matching attributes, power offsets and the like.

The invention claimed is:

1. A method, comprising:
controlling a variable of transmission, wherein transmission is effected by repeatedly sending data units, and a control of the variable of the transmission is performed based on a target data unit error rate;
detecting whether a received data unit includes an error;
analyzing, when an error is detected, a transmission number of the data unit;
detecting whether an analyzed transmission number of the data unit is equal to a target transmission number, wherein the transmission number indicates a number of reception attempts at a receiver side;
forwarding the data unit to a network control element when the transmission number of the data unit is equal to the target transmission number or, forwarding the data unit to the network control element when no error is detected, wherein the target transmission number indicates a target number of reception attempts at the receiver side; and
determining, in the network control element, the target data unit error rate based on a ratio between receptions of data units that include an error with the transmission number being equal to the target transmission number, and receptions of data units without error.

2. The method according to claim 1, wherein a transmission power is used as a variable of the transmission and a closed-loop control of the transmission power is used as a control of the variable of the transmission.

3. The method according to claim 1, wherein the network control element comprises a radio network controller.

4. The method according to claim 2, wherein an outer loop power control is used as the control of the transmission power.

5. The method according to claim 1, further comprising:
indicating the transmission number of the data unit in a data unit header.

6. The method according to claim 1, wherein the transmission is performed using a physical layer retransmission and combining scheme.

7. The method according to claim 6, wherein at least one of a hybrid automatic repeat request and its variants is used as the physical layer retransmission and combining scheme.

8. The method according to claim 1, wherein the transmission number comprises a diversity order and the target transmission number comprises a diversity target.

9. The method according to claim 8, wherein the diversity comprises a time diversity.

10. The method according to claim 9, further comprising:
using multipath diversity for the transmission.

11. An apparatus, comprising:
a processor;
a memory including a computer program code,
wherein the memory and the computer program code are configured, with the processor, to cause the apparatus, at least, to
control a variable of transmission, wherein the transmission is effected by repeatedly sending data units, and the processor is configured to perform a control of the variable of the transmission based on a target data unit error rate,
collect statistics regarding a positive or a negative result of an error check of data unit transmissions, and
determine a target data unit error rate based on a ratio between receptions of data units with error with a transmission number being equal to a target transmission number, and receptions of data units without error, wherein the transmission number indicates a number of reception attempts at a receiver side, and the target transmission number indicates a target number of reception attempts at a receiver side.

12. The apparatus according to claim 11, wherein a variable of the transmission comprises a transmission power and a control of the variable of transmission comprises a closed-loop control of the transmission power.

13. The apparatus according to claim 11, wherein the apparatus comprises a radio network controller.

14. The apparatus according to claim 12, wherein the control of the transmission power comprises an outer loop power control.

15. The apparatus according to claim 11, wherein the apparatus is configured to perform the transmission using a physical layer retransmission and combining scheme.

16. The apparatus according to claim 15, wherein the physical layer retransmission and combining scheme is at least one of a hybrid automatic repeat request and its variants.

17. A system comprising:
a fixed network controller comprising:
a processor configured to detect whether a received data unit includes an error,
analyze a transmission number of a data unit when the data unit includes an error, wherein the transmission number indicates a number of reception attempts at a receiver side,
detect whether a transmission number of the data unit including an error is equal to or below a target transmission number, wherein the target transmission number indicates a target number of reception attempts at the receiver side, and a transmitter configured to forward the data unit to a network when the transmission number of the data unit is equal to the target transmission number or when no error is detected; and a network controller comprising a processor configured to collect statistics regarding a positive or negative result of an error check of data unit transmissions, and determine a target data unit error rate based on a ratio between receptions of data units with error, with a transmission number being equal to a target transmission number, and receptions of data units without error.

18. An apparatus, comprising:

controlling means for controlling a variable of transmission, wherein the transmission is effected by multiple sending of data units, and the apparatus is configured to perform a control of the variable of the transmission based on a target data unit error rate, collecting means for collecting statistics regarding a positive or a negative result of an error check of data unit transmissions; and determining means for determining the target data unit error rate based on a ratio between receptions of data units with error with a transmission number being equal to a target transmission numbers and receptions of data units without error, wherein the transmission number indicates a number of reception attempts at a receiver side, and the target transmission number indicates a target number of reception attempts at the receiver side.

19. A method, comprising:

controlling a variable of transmission, wherein the transmission is effected by multiple sending of data units, and a control of the variable of the transmission based on a target data unit error rate is performed;

collecting statistics regarding a positive or a negative result of an error check of data unit transmissions; and determining a target data unit error rate based on a ratio between receptions of data units with error, with a transmission number being equal to a target transmission number and receptions of data units without error.

20. The method according to claim 19, wherein a variable of the transmission comprises a transmission power and a control of the variable of transmission comprises a closed-loop control of the transmission power.

21. The method according to claim 20, wherein the control of the transmission power comprises an outer loop power control.

22. The method according to claim 19, further comprising:

performing the transmission using a physical layer retransmission and combining scheme.

23. The method according to claim 22, wherein the physical layer retransmission and combining scheme is at least one of a hybrid automatic repeat request and its variants.

24. A computer program embodied on a computer-readable storage medium, the program configured to control a processor to perform:

control a variable of transmission, wherein the transmission is effected by multiple sending of data units, and a control of the variable of the transmission is performed based on a target data unit error rate;

collect statistics regarding a positive or a negative result of an error check of data unit transmissions; and determine a target data unit error rate based on a ratio between receptions of data units with error with a transmission number thereof being equal to a target transmission numbers and receptions of data units without error.

* * * * *